United States Patent [19]
Seong

[11] Patent Number: 5,675,485
[45] Date of Patent: Oct. 7, 1997

[54] SWITCHING MODE POWER SUPPLY CONTROLLER

[75] Inventor: Hwan-Ho Seong, Seoul, Rep. of Korea

[73] Assignee: Samsung Electronics Co., Ltd., Suwon, Rep. of Korea

[21] Appl. No.: 538,808

[22] Filed: Oct. 3, 1995

[30] Foreign Application Priority Data

Dec. 22, 1994 [JP] Japan ................................ 94-35952

[51] Int. Cl.$^6$ .................................................. H02M 3/335
[52] U.S. Cl. ............................ 363/97; 363/21; 363/49
[58] Field of Search ................................ 363/21, 49, 95, 363/97, 131

[56] References Cited

U.S. PATENT DOCUMENTS

| | | | |
|---|---|---|---|
| 4,694,384 | 9/1987 | Steigerwald et al. | 363/98 |
| 4,837,452 | 6/1989 | Peterson | 363/21 |
| 4,862,339 | 8/1989 | Inou et al. | 363/21 |
| 4,881,014 | 11/1989 | Okochi | 363/97 |
| 4,956,761 | 9/1990 | Higashi | 363/21 |
| 4,967,332 | 10/1990 | Claydon et al. | 363/98 |
| 4,975,623 | 12/1990 | Rilly et al. | 363/49 |
| 5,014,178 | 5/1991 | Balakrishnan | 363/97 |
| 5,262,933 | 11/1993 | Shyi-Hon | 363/49 |
| 5,297,014 | 3/1994 | Saito et al. | 363/97 |
| 5,301,095 | 4/1994 | Teramoto et al. | 363/21 |
| 5,313,381 | 5/1994 | Balakrishnan | 363/21 |
| 5,335,162 | 8/1994 | Martin-Lopez et al. | 363/95 |
| 5,475,579 | 12/1995 | John et al. | 363/21 |
| 5,498,995 | 3/1996 | Szepesi et al. | 363/97 |

*Primary Examiner*—Jeffrey L. Sterrett
*Attorney, Agent, or Firm*—Allen LeRoy Limberg

[57] ABSTRACT

A controller for a switching mode power supply has connections for receiving direct operating potential, a voltage comparator for comparing a fraction of the direct operating potential to a first direct reference potential for developing a voltage comparator output signal, an oscillator for generating oscillations of a prescribed frequency, a pulse width modulator for supplying pulses at a rate determined by those oscillations and with a width controlled by the comparator output signal, and an under-voltage lock-out circuit producing a controlling signal to selectively disable the output pulse signal. The controller is included in a switching mode power supply receiving input power having a direct input potential. The switching mode power supply has a transformer for transforming an alternating voltage generated from the direct input potential; a rectifier for rectifying transformed alternating voltage to produce a direct output potential; a regulator sinking current responsive to the direct output potential from said rectifier being larger or smaller larger than a second direct reference potential; a photo-coupler conducting as input current the current sunk by the regulator, converting the current into an optical signal, and then converting said optical signal into an electric signal; and a switching controlling unit producing a controlling signal to control selective application of the direct input potential to the transformer in response to output current demanded by the photo-coupler. The switching controlling unit comprises a switching-mode-power-supply controller for performing the function of power supply, feedback and soft-start, in response to an operating voltage signal supplied thereto through external pins thereof; a resistor and capacitor converting the magnitude of the current supplied from the photo-coupler into the operating voltage signal; and a switching transistor cyclically tuned on and off in response to a pulse signal produced from the switching-mode-power-supply controller. The switching transistor selectively applies the direct input potential to the transformer for generating the alternating voltage that is transformed.

18 Claims, 5 Drawing Sheets

SWITCHING MODE POWER SUPPLY CONTROLLER

BACKGROUND OF THE INVENTION

(1) Field of the invention

The invention relates to a controller for a switching mode power supply and a switching mode power supply having this controller. More particularly, it relates to a controller for switching mode power supply and a switching mode power supply using this controller, in which the functions of power supply, feedback and soft-start are integrated on a single chip with a minimum number of external components, such as connection pins.

(2) Description of Prior Art

A switching mode power supply has been widely used since this supply can supply a great amount of power at a prescribed voltage with a relatively small-sized transformer. Accordingly, its volume and weight are both relatively small compared with other power supply configurations capable of delivering the same power. This makes switching mode power supplies a good choice in electronics systems using semiconductor devices for small size and light weight.

FIG. 1 is a block diagram of a general switching mode power supply. As shown in FIG. 1, the general switching mode power supply includes a rectifier 11 that rectifies alternating-current power (AC power) to supply direct-current power (DC power), a switch 12 responsive to a controlling signal for selectively applying the voltage from the rectifier 11 to the primary winding of a transformer 13 to produce a high-frequency alternating signal component therein, a transformer 13 that generates a rectangular alternating voltage across its secondary winding as the switch 12 turns on and off, a high-frequency rectifier 14 that rectifies the high-frequency alternating voltage from the transformer 13 to produce a DC power output voltage, a regulator 15 that maintains a constant output voltage from the high-frequency rectifier 14 through control of the duty cycle of the switch 12, a photo-coupler 16 that converts an electric signal input from the regulator 15 into an optical signal and converts this optical signal into another electric signal, and a switching controlling unit 17 that produces a controlling signal to control the selective conduction through the switch 12 in response to a signal input from the photo-coupler 16.

The FIG. 2 switching mode power supply generates an error signal for feedback according to the departure of the DC output voltage from a prescribed level. This error signal originates in the regulator 15 and is supplied via the photo-coupler 16 to the switching controlling unit 17. This error signal controls the lengths of time that the switch 12 is conductive to drive current into the primary winding of the transformer 13, thereby controlling the voltages appearing across the windings of the transformer 13 so the rectified voltage from the secondary winding of the transformer 13 produces a substantially constant DC output voltage of regulated value. If the DC output voltage of the switching mode power supply tends to drop below the prescribed level, the driving pulse duty ratio of the switching transistor installed in the switching controlling unit 17 is increased, to introduce an offsetting countertendency to raise the DC output voltage. If the DC output voltage tends to rise above the prescribed level, the driving pulse duty ratio of the switching transistor in the switching controlling unit 17 is reduced, to introduce an offsetting countertendency to lower the output voltage. So, a substantially constant output voltage is maintained regardless of change in loading of the supply. Accordingly, the switching controlling unit 17 plays an important part in the switching mode power supply.

FIG. 2 is a block diagram of a conventional switching mode power supply; and FIG. 3 is a detailed block diagram of the controller 271 included in the FIG. 2 switching mode power supply. The following description referring to FIGS. 2 and 3 concerns a conventional switching mode power supply and a conventional switching controlling unit.

The conventional switching mode power supply of FIG. 2 includes a rectifier 21, which rectifies the voltage from an alternating current (AC) power supply to provide a direct voltage; a switch in the FIG. 3 controller 271, which controls the generation of a high-frequency alternating voltage from the rectifier 21 in response to a controlling signal; a transformer 23 that transforms the voltage appearing across its primary winding responsive to the switch being alternately switched into and out of conduction, to generate a high-frequency alternating voltage; a high-frequency rectifier 24 that rectifies the high-frequency alternating voltage from the transformer 23 to supply DC output voltage; a regulator 25 that maintains a constant DC output voltage by controlling the duty ratio of the switch, a photo-coupler 26 that converts an electric signal input from the regulator 25 into an optical signal and then converts the optical signal into another electric signal, and a controller 27 for the FIG. 2 switching mode power supply that produces DC power input signal from the rectifier 24 in response to photo-coupler 26, and snubber circuits 22 that protect a switch transistor in the controller 271. The photo-coupler 26 cooperates with the transformer 23 to provide direct-current isolation between the input and output circuitry of the FIG. 2 switching mode power supply, so these circuits can be independently grounded. Where independent grounding of the input and output circuitry of the switching mode power supply is not required, as when the transformer 23 is connected as an auto transformer with portions of the primary and secondary windings in common, other means of direct coupling feedback error signal can be employed, as known in the prior art. The switching controlling unit 27 includes a controller 271 for the FIG. 2 switching mode power supply having a ground terminal 2 grounded to primary AC power supply ground neutral and a power terminal 3 and an output terminal 1 respectively connected to the snubber 22, resistance 272 and a capacitor 273 connected between a feedback terminal 5 of the controller for switching mode power supply and ground, capacitor 274 connected between ground and a soft starting terminal 4 of the controller 271 for switching mode power supply, and components 275 to 278 forming a power supplying circuit.

The FIG. 3 controller 271 for the FIG. 2 switching mode power supply includes an under-voltage lock-out (UVLO) 2710, a latch 2711, a thermal shut down (TSD) 2712, an oscillator 2713, a pulse width modulator (PWM) 2714, a driver 2715, a flip-flop 2716, a current limiter (CL) 2717, and a switching transistor 2718.

The operation of the conventional switching mode power supply is described as follows. Once the AC power is applied to the switching mode power supply, this power is rectified by the rectifier 21 and has its AC ripple suppressed by filtering included within the rectifier 21, converting the alternating voltage of the AC power supply into a direct voltage. This direct voltage is applied to the primary or input winding of the transformer 23 when the switching transistor 2718 in the controller 271 is rendered conductive, causing current flow through the primary winding as the magnetic field surrounding the winding builds up, storing energy. When the switching transistor 2718 is rendered nonconductive, the current flow through the primary winding continues as the magnetic field surrounding the winding collapses, releasing the stored energy and causing a flyback voltage to appear across the primary winding that is opposite in polarity to the direct voltage applied to the primary winding of the transformer 23 when the switching transistor 2718 in the controller 271 is conductive. The magnitude of the flyback voltage depends on the duty ratio of the switch provided by the switching transistor 2718—that is, the ratio between the duration of its conduction and the duration of its non-conduction. The substantially rectangular voltage waveform appearing across the primary or input winding of the transformer 23 is reproduced across its secondary or output winding with a scaling determined by the turns ratio between the windings, to generate a pulse voltage across the secondary winding for application to the rectifier 24.

The rectifier 24 rectifies this pulse voltage and produces it as a DC output voltage. The DC output voltage, the output voltage of the rectifier 24, is supplied to the regulator 25 and compared to a voltage of a prescribed value for developing an error voltage, which error voltage is applied to the photo-coupler 26 to drive a light-emitting diode in its input circuit. The signal converted into an optical signal by the light-emitting diode of the photo-coupler 26 is converted into another electric signal by a photo-transistor in the output circuit of the photo-coupler 26, and applied to the feedback terminal 5 of the controller 271 in the switching controlling unit 27 for the FIG. 2 switching mode power supply.

In the controller switching-mode-power-supply controller 271, as shown in detail in FIG. 3, the oscillator 2713 determines the rate of the pulses that are to be supplied from the pulse width modulator 2714 to the driver 2715. The pulse width modulator 2714 modulates the width of the pulse signal supplied to the driver 2715 in response to a signal applied to the feedback terminal 5, which pulse signal is used for conditioning the switching transistor 2718 for conduction and for non-conduction depending on whether the pulse signal is in its high or low voltage state. The alternate conduction and non-conduction of the switching transistor 2718 causes a high-frequency alternating voltage to be induced across the input winding of the transformer 23, and an ouput alternating voltage is induced in the output winding. The magnitude of the power transmitted to the output winding from the input winding of the transformer 23 is controlled according to the turn-on/turn-off driving time, or duty ratio, of the switching transistor 2718.

Referring to FIG. 3, in the controller 271 for the switching controlling unit 27 of the FIG. 2 switching mode power supply, the pulse width modulator 2714 regulates the time when the pulse signal is produced to the driver 2715 in response to the signal that is supplied to the shunt regulating terminal 4 to make the entire switching mode power supply soft start. The soft start can make the input energy (voltage and current) of the switching mode power supply gradually increase from zero at an initial starting stage, and has advantages of the safe start of the switching mode power supply and the reduction of the noise. The conventional switching mode power supply, however, as mentioned above has a problem in that the controller 271 for switching mode power supply has five external pins. This problem should be remedied to manufacture semiconductor integrated circuits of lighter weight and smaller size.

FIG. 4 depicts a three-terminal switching mode power supply integrated circuit disclosed in U.S. Pat. No. 5,313,381 granted on May 17, 1994. This circuit includes a rectifier 41 that rectifies the alternating voltage from an AC power supply to provide a direct voltage, a transformer 43 that has the direct voltage from rectifier 41 selectively applied to its primary or input winding, a high-frequency rectifier 44 that rectifies a signal input from the secondary or output winding of the transformer 43 to provide another direct voltage as an output voltage, a regulator 45 that determines the departure of the output voltage from a prescribed value for generating an error signal, a photo-coupler 46 that converts an electric signal input from the regulator 45 into an optical signal and then converts again the optical signal into an electric signal, and a switching controlling unit 47 that outputs a controlling signal for controlling the selective application of the direct voltage from rectifier 41 to the primary or input winding of the transformer 43 in response to a signal input from the photo-coupler 46. The switching controlling unit 47 includes a controller for switching mode power supply 471, a switching transistor 472 having a gate terminal connected to an output terminal of the controller for switching mode power supply 471 and a drain terminal connected to the primary winding of the transformer 43, and a capacitor 473 connected between an output terminal of the photocoupler 46 and the controller for switching mode power supply 471.

The operation of the conventional switching mode power supply is as follows. When AC power is applied, its alternating voltage is rectified by the rectifier 41 and converted to a direct voltage selectively applied across the primary or input winding of the transformer 43 when the switching transistor 472 is conductive. The power supplied to the primary or input winding of the transformer 43 for storage in the magnetic field surrounding its windings is regulated by a controlling signal of the switching controlling unit 47 and is converted into a pulse voltage, and which pulse voltage is transformed by the transformer 43 to be produced from its secondary or output winding to the high-frequency rectifier 44. The high-frequency rectifier 44 rectifies this transformed voltage to supply a DC output voltage. The DC output voltage from the high-frequency rectifier 44 is supplied to the regulator 45, which generates an error voltage applied to the photo-coupler 46 for driving a light-emitting diode therein. The signal converted into an optical signal by the light-emitting diode of the photo-coupler 46 is converted into another electric signal by the light-receiver of the photo-coupler 46, which is then applied to feedback/power terminal (FB/VS) of the controller 471 in the switching controlling unit 47 of the FIG. 4 switching mode power supply.

The controller 471 for the switching controlling unit 47 responds to a signal input to the feedback/power terminal (FB/VS) to vary the width of the pulse signal it applies to the switching transistor 472 for turning the switching transistor 472 on and off. When the switching transistor 472 is turned on or off, high-frequency alternating voltage is induced across the input winding of the transformer 43, and a corresponding output alternating voltage is induced across the output winding of the transformer 43. In that case, the magnitude of the power applied from the input winding of the transformer 43 to the output winding in response to the turn-on/turn-off driving time of the switching transistor 472 can be adjusted. The FIG. 4 switching mode power supply, however, lacks soft start function of the controller for switching mode power supply.

The inventor sought to develop a controller for a switching mode power supply that permitted integrating the functions of power supply, feedback and soft-start on a single chip with a minimum number of external pins.

SUMMARY OF THE INVENTION

A controller for a switching mode power supply embodying an aspect of the invention has first and second connections for receiving direct operating potential for the controller and a third connection for supplying pulses to the switch in the switching mode power supply, so only three external pins are needed. The controller includes an oscillator powered by application of the direct operating potential for generating oscillations of a prescribed frequency, a voltage comparator for comparing a fraction of said direct operating potential received by the controller to a direct reference potential for developing a voltage comparator output signal, and a pulse width modulator for supplying an output pulse signal including pulses of a rate determined by the oscillations of a prescribed frequency generated by the oscillator and with a width controlled by the comparator output signal. The duty ratio of an output pulse is larger or smaller in amplitude depending on whether the fraction of the direct operating potential received by the controller is larger or smaller than the direct reference potential. The controller further includes an under-voltage lock-out circuit producing a controlling signal and an AND gate for selectively transmitting the output pulse signal of the pulse width modulator in response to the controlling signal from the under-voltage lock-out circuit. The under-voltage lock-out circuit enables the AND gate to transmit the output pulse signal of the pulse width modulator when the direct operating potential for the controller has risen above a higher threshold voltage since failing below a lower threshold voltage. The under-voltage lock-out circuit disables transmission of the output pulse signal of the pulse width modulator through the AND gate when the direct operating potential for the controller falls below a lower threshold voltage.

DETAILED DESCRIPTION OF A PREFERRED EMBODIMENT

Figure 1:
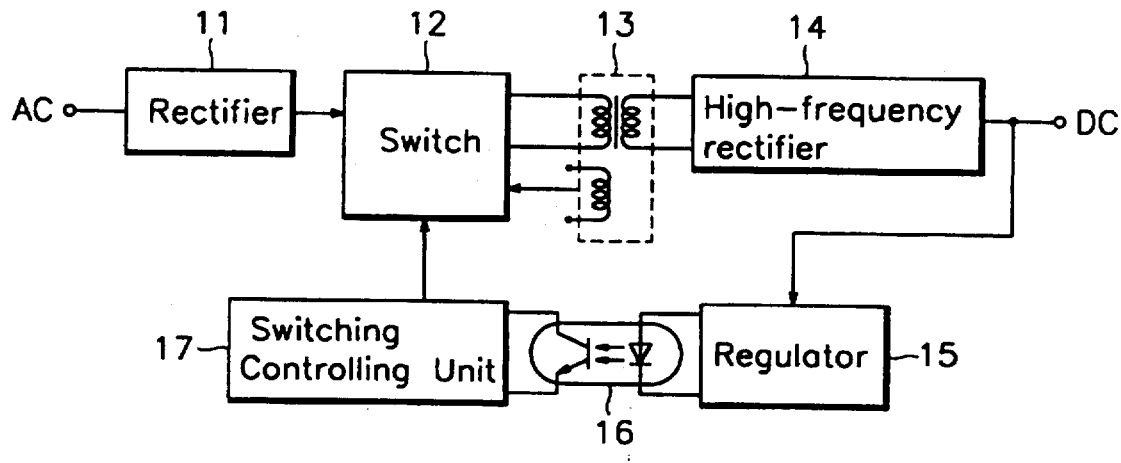
FIG. 1 is a general block diagram of a switching mode power supply.
Figure 2:
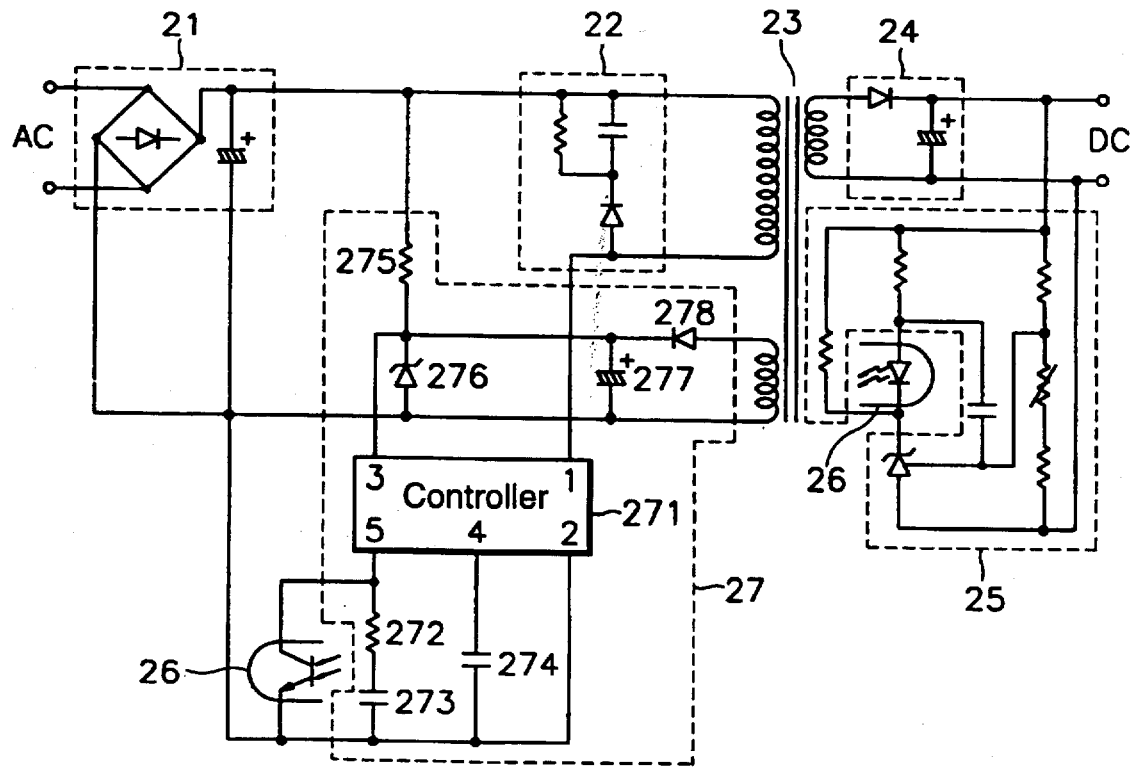
FIG. 2 is a block diagram of a particular prior-art switching mode power supply.
Figure 3:
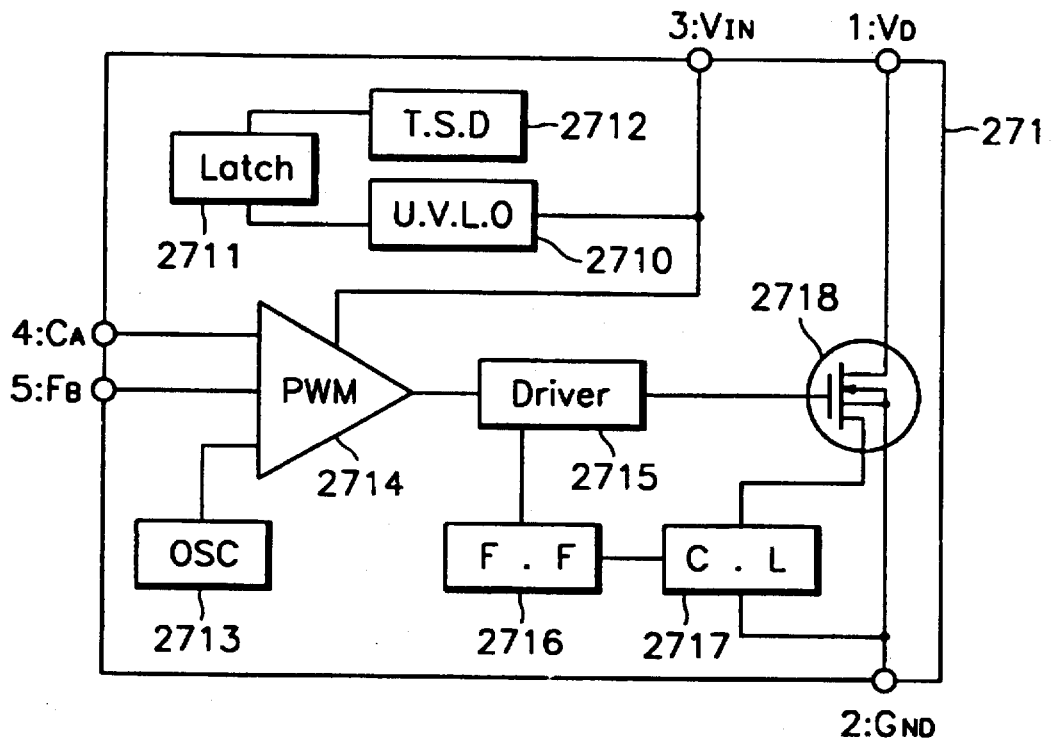
FIG. 3 is a block diagram of a controller for switching mode power supply of FIG. 2.
Figure 4:
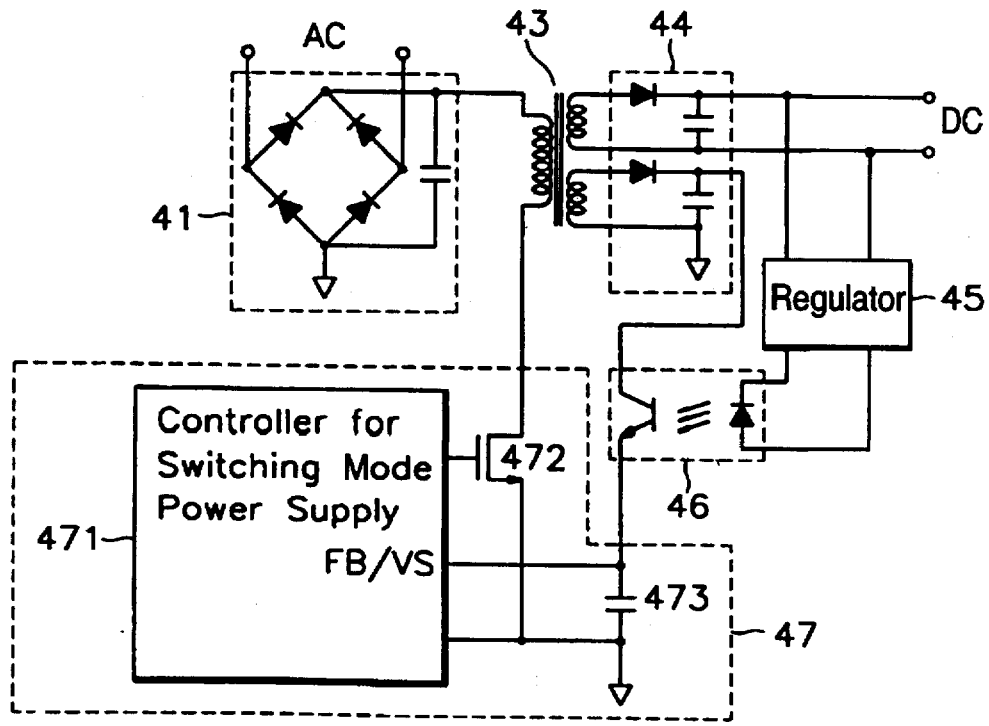
FIG. 4 is a block diagram of another particular prior-art switching mode power supply.
Figure 5:
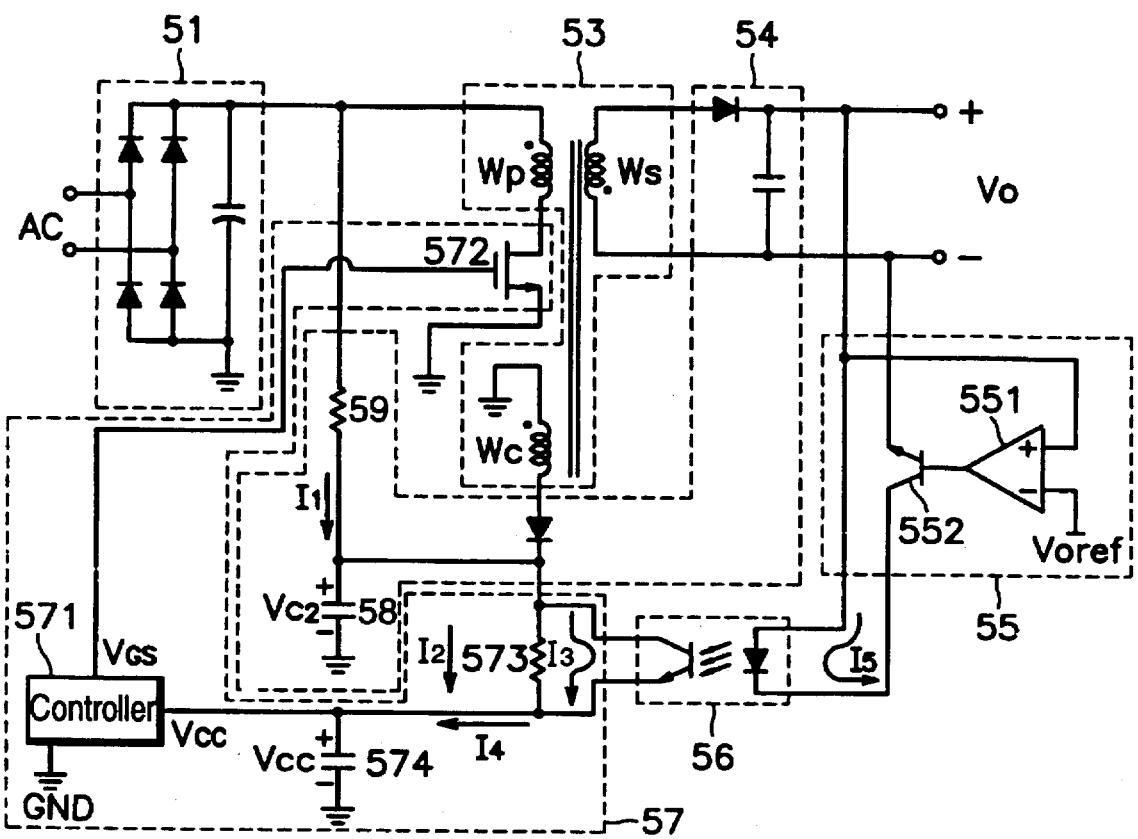
FIG. 5 is a block diagram of a switching mode power supply in accordance with a preferred embodiment of the present invention.

A preferred embodiment of the invention will be described with reference to FIGS. 5–8 of the accompanying drawing. As shown in FIG. 5, the switching mode power supply of the present invention includes a rectifier 51 that rectifies the alternating voltage of an AC power supply to supply a direct voltage, a transformer 53 having a primary or input winding to which that direct voltage is selectively applied for inducing a high-frequency alternating voltage thereacross, a high-frequency rectifier 54 that rectifies the transformed high-frequency alternating voltage appearing across the secondary or output winding of the transformer 53 and supplies another direct voltage as a DC output voltage, a regulator 55 that sinks relatively more current when the DC output voltage from the high-frequency rectifier 54 is larger than the reference voltge $V_{oref}$ and sinks relatively less current when the DC output voltage is smaller than the reference voltage $V_{oref}$, a photocoupler 56 having a light-emitting diode therewithin for conducting the current that the regulator 55 sinks and convening the current into an optical signal and then converting this optical signal into another electric signal, and a switching controlling unit 57 that selectively applies the direct voltage from the rectifier 51 to the primary or input winding of the transformer 53 in response to the signal input from the photo-coupler 56. The transformer 53 is designed for energy storage, being provided with a core structure that exhibits little or no magnetic saturation and causes the windings to exhibit substantial inductances.

The regulator 55 includes a differential-input amplifier 551 having a non-inverting input terminal connected to an output terminal of the rectifier 54 and having an inverting input terminal connected to reference voltage $V_{oref}$, and a common-emitter-amplifier transistor 552 having a base electrode to which an output terminal of the amplifier 551 connects and a collector electrode for sinking current flowing through the light-emitting diode of the photocoupler 56.

The switching controlling unit 57 includes a switching-mode-power-supply controller 571; a switching transistor 572 having a source electrode connected to primary AC power supply ground neutral, having gate terminal connected to an output terminal of the controller 571, and having a drain terminal for connection to the end of the primary winding of the transformer 53 remote from the end connected to recive direct potential from the rectifier 51; a resistance 573 connected across the output terminals of the photo-coupler 56 in parallel with the emitter-to-collector path of a photo-transistor in the photo-coupler 56; and a capacitor 574 connected between primary AC power supply ground neutral and the switching-mode-power-supply controller 571. In this preferred embodiment the switching transistor 572 is designed to be included outside the switching-mode-power-supply controller 571. However, in other embodiments of the invention, this switching transistor 572 may be installed inside the controller 571.

Figure 6:
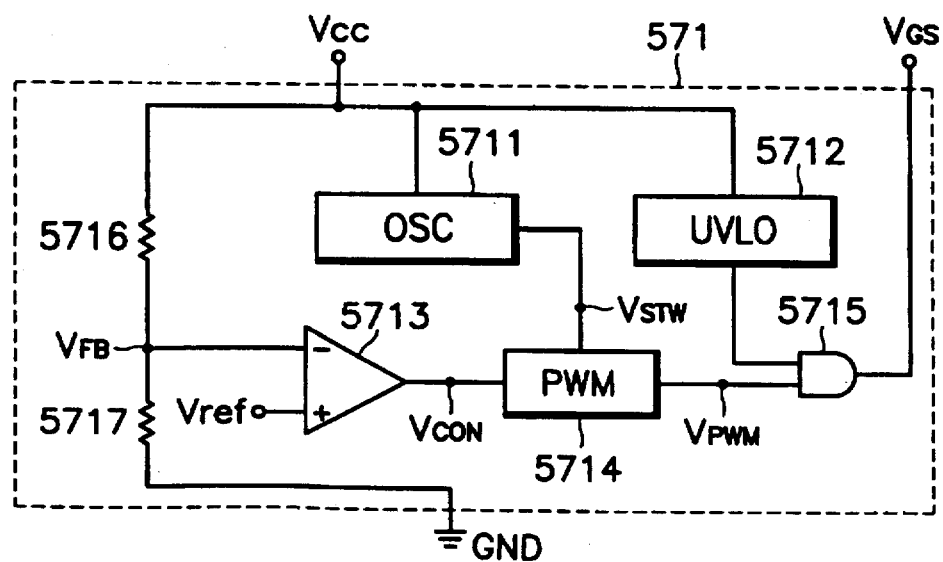
FIG. 6 is a block diagram of a controller for switching mode power supply in accordance with the preferred embodiment of the present invention.

FIG. 6 is a block diagram of the switching-mode-power-supply controller 571 that embodies a principal aspect of the present invention. FIG. 6 shows the controller 571 including an oscillator 5711, an under-voltage lock-out circuit 5712, a resistive voltage divider comprising resistances 5716 and 5717 serially connected between an operating voltage $V_{CC}$ input connection and a ground connection, an amplifier 5713 having an inverting input terminal connected to the interconnection between the resistances 5716 and 5717 and a non-inverting input terminal connected to reference voltage $V_{ref}$, a pulse width modulator 5714 having respective input terminals connected to output terminals of the amplifer 5713 and the oscillator 5711, and an AND gate 5715 having respective input connections from output terminals of the under-voltage lock-out 5712 and pulse width modulator 5714.

The operation of the switching-mode-power-supply controller 571 and the switching mode power supply it is included in will next be considered. During times of normal, continuing operation input signal from the oscillator 5711 to the pulse width modulator 5714 determines the rate of the pulses that the pulse width modulator 5714 supplies. The amplifier 5713 functions as a voltage comparator for comparing a fraction of an operating voltage $V_{CC}$ applied to the switching-mode-power-supply controller 571 with a reference voltage $V_{ref}$ to develop a signal supplied to the pulse width modulator 5714 for controlling the width of the pulses it supplies. The fraction of the operating voltage $V_{CC}$ is determined by the resistive voltage divider comprising the resistances 5716 and 5717 serially connected between the operating voltage $V_{CC}$ input connection and a connection to AC primary power ground neutral. The reference voltage $V_{ref}$ is a direct potential of substantially fixed potential, which substantially fixed potential is preferably derived from the operating voltage $V_{CC}$. For example, the substantially fixed potential can be developed by the potential drop across a semiconductor junction biased by current supplied through a bleeder resistor. Another known way for developing the substantially fixed potential is to use a band-gap reference circuit.

When the AC power supply voltage is applied, it is rectified by the rectifier 51 and converted into direct voltage to be selectively applied to the primary or input winding of the transformer 53. The selective application of the direct voltage to the primary or input winding of the transformer 53 in response to a controlling signal of the switching controlling unit 57 induces a pulse voltage across that winding. This pulse voltage is transformed by the transformer 53 to be supplied from its secondary or output winding to the high-frequency rectifier 54. The high-frequency rectifier 54 rectifies the pulse voltage applied thereto to produce a DC output voltage $V_o$. The direct voltage $V_o$ supplied as an output voltage of the high-frequency rectifier 54 is supplied to the regulator 55 for comparison to a voltage of a predetermined level to generate an error signal applied to the photo-coupler 56 to drive a light-emitting diode therewithin. The signal converted into an optical signal by the light-emitting diode in the input circuit of the photo-coupler 56 is then converted into another electric signal by a photo-transistor in the output circuit of the photo-coupler 56. The photo-coupler 56 cooperates with the transformer 53 to provides direct-current isolation between the input and output circuitry of the FIG. 5 switching mode power supply, so these circuits can be independently grounded. Where independent grounding of the input and output circuitry of the switching mode power supply is not required, other means of direct coupling feedback error signal can be employed, as known in the prior art. The electric signal from the photo-coupler 56 is applied as a feedback error signal to an input terminal of the switching-mode-power-supply controller 571.

The controller 571 responds to an operating voltage $V_{CC}$ supplied to an input terminal thereof for varying the width of the pulse signal applied to the switching transistor 572 to control its turning on and turning off. When the switching transistor 572 is alternately turned on and off, high-frequency alternating voltages are induced at the input and output windings of the transformer 53. The amplitude of the voltage transmitted to the output winding of the transformer 53 from an input winding may be controlled according to the turn-on or turn-off driving time of the switching transistor 572.

More particularly, in accordance with Coulomb's Law, the operating voltage $V_{CC}$ is developed between the plates of the capacitor 574 in response to the charge stored in the dielectric of the capacitor 574. The operating voltage $V_{CC}$ powers the elements within the controller 571, with the operating current $I_4$ tending to discharge the capacitor 574 and lower the operating voltage $V_{CC}$ developed between the plates of the capacitor 574. During start-up, when direct input potential is initially supplied from the primary direct current supply (rectifier 51 for the AC power), the capacitor 574 is charged toward the direct input potential through the current-limiting resistance of the resistive path through the resistors 59 and 573. This lifts the operating voltage $V_{CC}$ into a voltage range in which the elements within the controller 571 receive sufficient operating potential to operate properly demanding a substantially constant operating current $I_4$, and the under-voltage lock-out circuit 5712 no longer blocks the transmission of pulse-width modulated pulses via the AND gate 5715 to the $V_{GS}$ external connection pin of the controller 571. With the commencement of switching in the primary switch transistor 572, pulsed current flow is induced in a tertiary winding $W_C$ of the transformer 53 and rectified to generate a regulated low direct supply voltage $V_{C2}$ appearing across the capacitor 58. The capacitor 574 continues to be charged by current $I_2$ flowing from this regulated low direct voltage supply through the resistor 573, as augmented by an additional charging current $I_3$ from the photo-transistor in the photo-coupler 56 output circuit.

Figure 7:
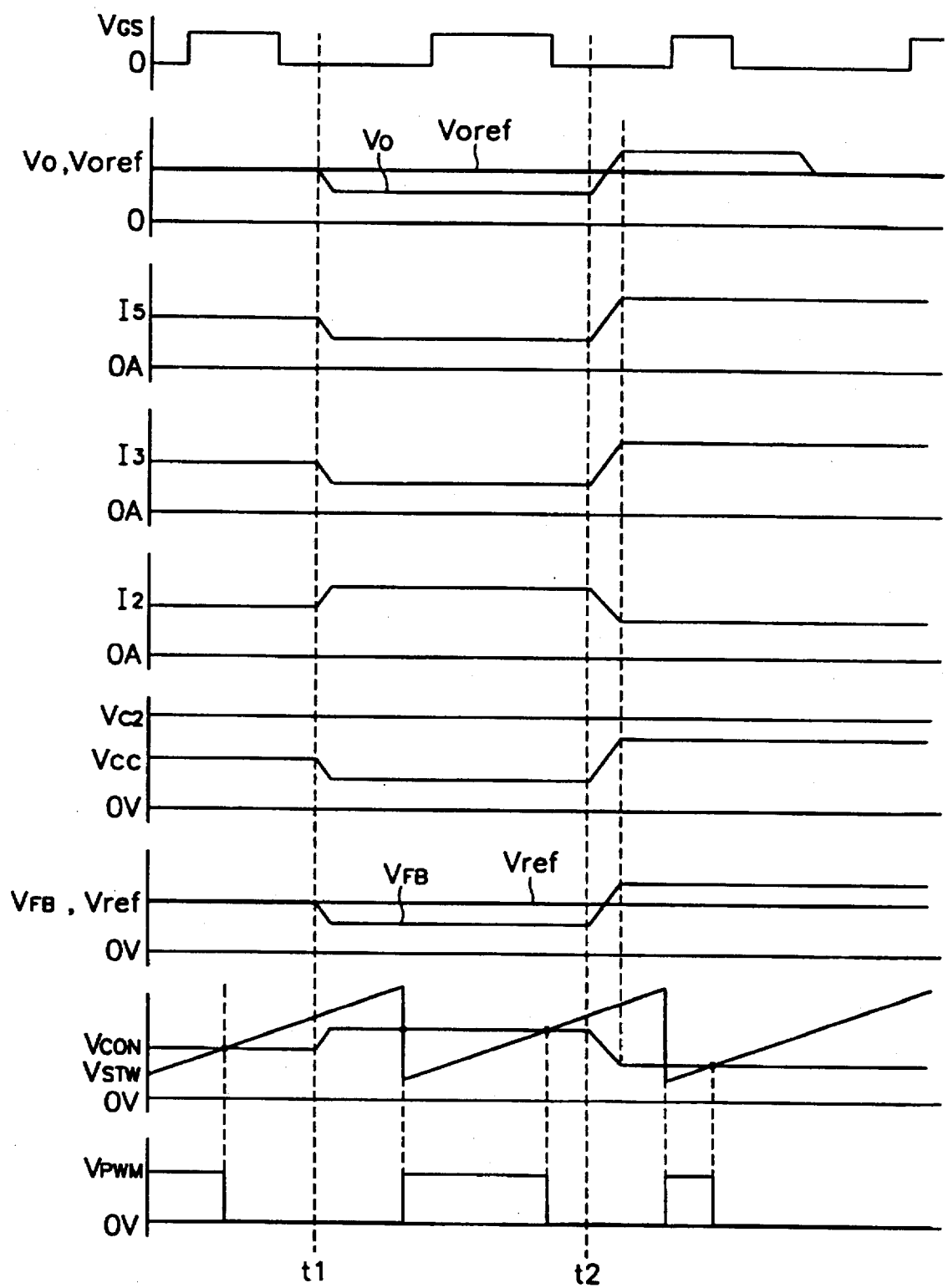
FIG. 7 is a waveform illustrating the feedback operation of the controller for switching mode power supply in accordance with the preferred embodiment of the present invention.

FIG. 7 depicts waveforms plotted against a common time axis for illustrating the feedback operation of the switching-mode-power-supply controller 571 constructed in accordance with an aspect of the present invention. Referring to FIG. 7, the feedback operation by the switching-mode-power-supply controller 571 is described as follows.

If output voltage $V_o$ from the high-frequency rectifier 54 is smaller than the reference voltage $V_{oref}$ of the regulator 55 as shown at time $t_1$ in FIG. 7, a lowered signal is produced from an amplifier 551 of the regulator 55 to decrease the base current of the transistor 552 thereby reducing a first current $I_5$ of the photo-coupler 56 flowing through a light emitting diode in its input circuit. If the first current $I_5$ of the photo-coupler 56 is decreased, a second current $I_3$ of the photo-coupler 56 is decreased, too. The switching-mode-power-supply controller 571 maintains the current $I_4$ it consumes almost constant. By Kirchoff's Law of Currents $I_4=I_2+I_3$. So, if the second current $I_3$ of the photo-coupler 56 is decreased, the current $I_2$ is increased. $V_{c2}$ is maintained constant or sustantially so. So, when in accordance with Ohm's Law the voltage drop is increased in the resistance 573 in response to the increase of the current $I_2$, there is a decrease in the voltage appearing across the capacitor 574, which voltage is the operating voltage $V_{CC}$ of the switching-mode-power-supply controller 571.

If the operating voltage $V_{CC}$ of the switching-mode-power-supply controller 571 is decreased, the width of output voltage $V_{CON}$ of the amplifier 5713 of the switching-mode-power-supply controller 571 is increased, and the width of a pulse signal $V_{PWM}$ produced from the pulse width modulator 5714 is increased to increase the duty ratio of the switching transistor 572 to increase the energy stored and released in the magnetic field surrounding the windings of the transformer 53, so as to increase the amplitude of the pulsed voltage supplied to the rectifier 54 and to increase the output voltage $V_o$ again.

At the time $t_2$, when the output voltage $V_o$ from the high-frequency rectifier 54 starts increasing more than the reference voltage $V_{oref}$ of the regulator 55, a high signal is produced from the amplifier 551 of the regulator 55 to increase the base current of the transistor 552 and the first current $I_5$ of the photo-coupler 56. If the first current $I_5$ of the photo-coupler 56 is increased, the second current $I_3$ of the photocoupler 56 is increased. The switching-mode-powersupply controller 571 maintains the current $I_4$ it consumes almost constant. By Kirchoff's Law of Currents $I_4=I_2+I_3$. Therefore, if the second current $I_3$ of the photocoupler 56 is increased, the current $I_2$ is decreased. $V_{c2}$ is maintained constant or sustantially so. So, when in accordance with Ohm's Law the voltage drop is decreased in the resistance 573 in response to the decrease of the current $I_2$, there is an increase in the voltage appearing across the capacitor 574, which voltage is the operating voltage $V_{CC}$ of the switching-mode-power-supply controller 571.

If the operating voltage $V_{CC}$ of the switching-mode-power-supply controller 571 is increased, the output voltage $V_{CON}$ of the amplifier 5713 of the switching-mode-power-supply controller 571 is decreased, and the width of the pulse signal $V_{PWM}$ produced from the pulse width modulator 5714 is reduced thereby reducing the output voltage $V_o$ again.

In the above-described operation, the output voltage $V_o$ of the high-frequency rectifier 54 is constantly maintained around the reference voltage $V_{oref}$ of the regulator 55.

Figure 8:
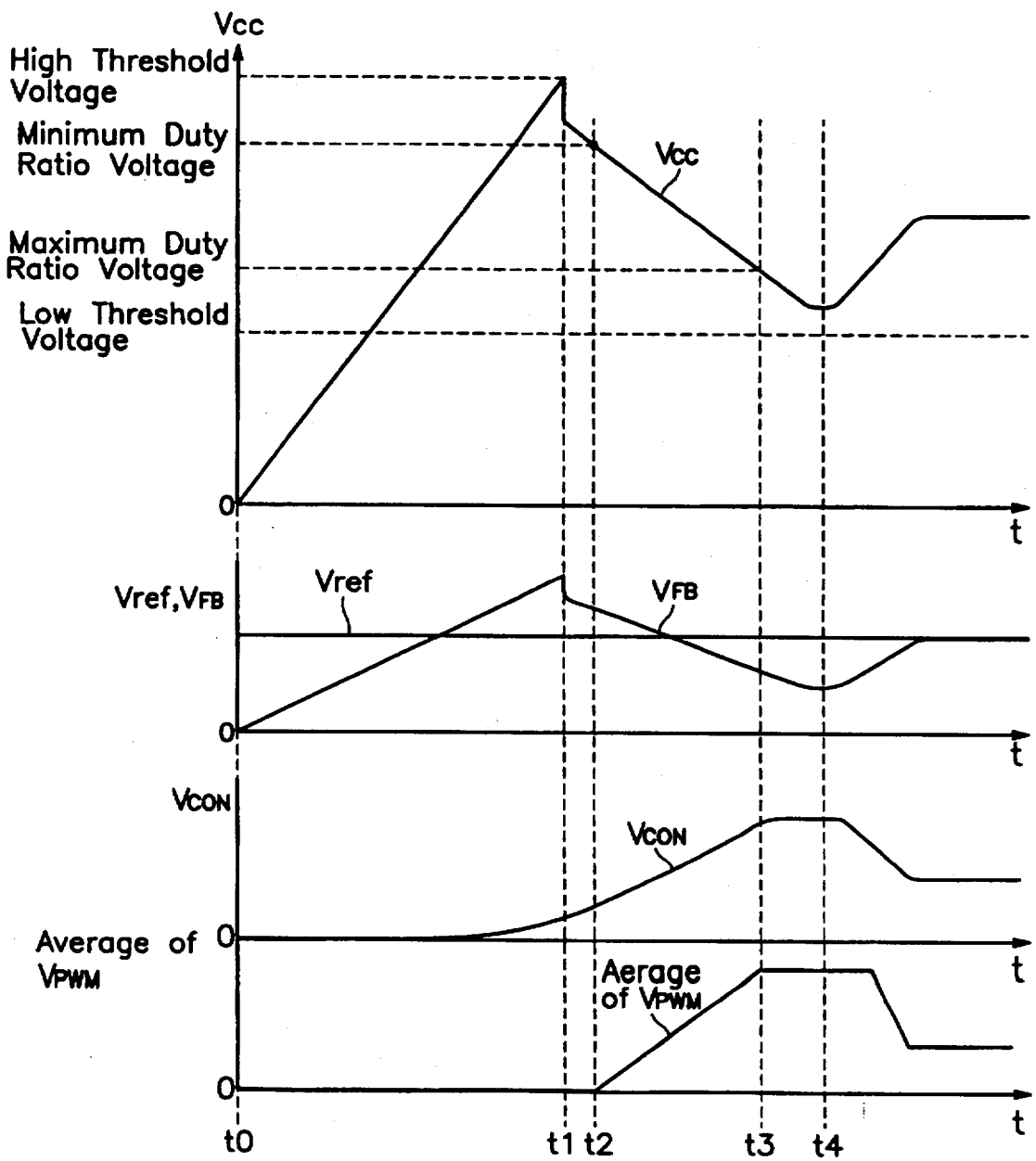
FIG. 8 is a waveform illustrating soft-start operation of the controller for switching mode power supply in accordance with the preferred embodiment of the present invention.

FIG. 8 is a waveform illustrating soft-start operation of the switching-mode-power-supply controller 571 in accordance with the preferred embodiment of the present invention. In the under-voltage lock-out 5712 of the switching-mode-power-supply controller 571, as the operating voltage $V_{CC}$ of the switching-mode-power-supply controller 571 increases from an initial zero voltage, the under-voltage lock-out 5712 disables the AND gate 5715 until the operating voltage $V_{CC}$ reaches a higher first one of first and second threshold voltages, in order to delay supplying a pulse signal $V_{GS}$ from the switching-mode-power-supply controller 571 to the gate electrode of the switching transistor 572. Until the operating voltage $V_{CC}$ attains the first threshold voltage, the switching transistor 572 receives no voltage pulses for rendering it conductive. Once the operating voltage $V_{CC}$ is higher than the first threshold voltage, the under-voltage lock-out 5712 enables the AND gate 5715 to produce the pulse signal $V_{GS}$ from the switching-mode-power-supply controller 571, and the under-voltage lock-out 5712 continues enabling the AND gate 5715 as long as the operating voltage $V_{CC}$ is not decreased below the lower second threshold voltage.

If the operating voltage $V_{CC}$ is decreased below the low threshold voltage, the under-voltage lock-out 5712 disables the AND gate 5715. Once the under-voltage lock-out 5712 disables the AND gate 5715, the under-voltage lock-out 5712 continues disabling the AND gate 5715 as long as the operating voltage $V_{CC}$ is not increased to be more than the high threshold voltage. If the operating voltage $V_{CC}$ again exceeds the high threshold voltage, the under-voltage lock-out 5712 again enables the AND gate 5715. That is, the operation of the under-voltage lock-out 5712 exhibits hysteresis.

As shown in FIG. 8, if the AC power is applied at the time $t_0$, the again $V_{CC}$ of the switching-mode-power-supply controller 571 increases gradually from zero voltage as the capacitor 574 is charged towards the voltage $V_{c2}$ through resistance 573. The voltage $V_{c2}$ increases from zero voltage as a capacitor 58 is charged through a resistance 59 towards the direct voltage developed by the rectifier 51.

At the later time $t_1$, when the operating voltage $V_{CC}$ attains the higher first threshold voltage of the under-voltage lock-out 5712, the switching-mode-power-supply controller 571 operates to cause pronounced increase in the current $I_4$. Simultaneously with (and because of) this pronounced increase in the current $I_4$, the current $I_2$ exhibits a pronounced increase. By Ohm's Law the voltage drop across resistance 573 is increased whereby the operating voltage $V_{CC}$ is reduced to a predetermined voltage, forming a step waveform, as shown in FIG. 8. If the value of the operating voltage $V_{CC}$ at which the pronounced increase in the current $I_4$ occurs is designed to be a little larger than that of the operating voltage $V_{CC}$ associated with the minimum duty ratio, the duty ratio of the pulse signal $V_{GS}$ produced from switching-mode-power-supply controller 571 is maintained above a minimum value, even though the controller 571 is immediately operative. The duty ratio of the pulse signal $V_{GS}$ is the same as the average of the pulse signal $V_{PWM}$, and its waveform is shown at the bottom of FIG. 8.

The more the operating voltage $V_{CC}$ is decreased due to the current $I_4$ consumed by the switching-mode-power-supply controller 571, the more the output voltage $V_{CON}$ of the operating amplifier 5713 is increased, and accordingly, the duty ratio of the output signal $V_{GS}$ of the switching-mode-power-supply controller 571 is gradually increased and reaches a temporary equilibrium at the time $t_3$.

At the time $t_4$, the current induced by another winding $W_c$ of the transformer, is applied to the switching-mode-power-supply controller 571 through the high-frequency rectifier 54, and the $V_{CC}$ is again increased. After that, the $V_{CC}$ is constantly maintained to have a constant duty ratio that meets the load condition indicated by the feedback error current $I_3$, and the FIG. 5 switching mode power supply reaches a final equilibrium in operating conditions.

The preferred embodiment of the present invention can provide a controller for switching mode power supply and a switching mode power supply including this controller that may have the functions of power supply, feedback and soft-start in a single chip with a minimum number of external pins to contribute to the manufacture of highly-integrated semiconductor devices.

While this invention has been described in regard to preferred embodiments thereof, it is to be understood that the invention is not limited to the disclosed embodiments, but, on the contrary, extends over various modifications and equivalent arrangements included within the spirit and scope of the appended claims. For example, where a DC primary power supply is available, rather than an AC primary power supply, the rectifier 51 is not used. As another example, a single-ended rather than balanced AC primary power supply can be used with suitable change in the rectifier 51. By way of further examples, the rectifier 54 may be replaced by a voltage doubler or one of other known voltage multiplying arrangements in other embodiments of the invention. A thermal shut down circuit may be incorporated into the switching-mode-power-supply controller 571 with the two-input AND gate 5715 being replaced by a three-input AND gate receiving input signals from the thermal shut down circuit, the under-voltage lock-out 5712 and the pulse width modulator 5714.

What is claimed is:

1. A controller for a switching mode power supply, said controller constructed as an integrated circuit with only three external connection pins, a first of said three external connection pins for receiving a reference ground potential, a second of said three external connection pins for receiving a direct potential used by said controller both as a direct operating potential and as an input control potential, and a third of said three external connection pins for supplying a pulsed output control potential, said integrated circuit receiving no electric power except via said three external connection pins and demanding a current flow between said first and second external connection pins of a prescribed substantially constant value at least when said direct potential is above a lower threshold voltage, said controller further comprising within said integrated circuit:

an oscillator powered by application of said direct operating potential for generating oscillations of a prescribed frequency;

a voltage comparator for comparing a fraction of said direct operating potential, as received by the controller via said second external connection pin, to a direct reference potential for developing a voltage comparator output signal;

a pulse width modulator for supplying an output pulse signal including pulses of a rate determined by said oscillations of a prescribed frequency generated by said oscillator and with a width controlled by said comparator output signal, the duty ratio of an output pulse being larger or smaller in amplitude depending on whether said fraction of said direct operating potential received by the controller via said second external connection pin is larger or smaller than said direct reference potential;

an under-voltage lock-out circuit producing a controlling signal, for disabling transmission of the output pulse signal of said pulse width modulator when the direct operating potential for the controller received via said second external connection pin has not risen above a higher threshold voltage since falling below said lower threshold voltage, and for enabling transmission of the output pulse signal of said pulse width modulator when the direct operating potential for the controller has risen above said higher threshold voltage since falling below said lower threshold voltage; and an AND gate for selectively transmitting the output pulse signal of said pulse width modulator via said third external connection pin, in response to said controlling signal from said under-voltage lock-out circuit.

2. The controller according to claim 1 included in a switching mode power supply for receiving input power supplied at a direct input potential from a primary power supply, which said switching mode power supply further comprises:

a transformer having a primary winding and a secondary winding;

a switching transistor, having a control electrode connected for receiving the selectively transmitted output pulse signal of said pulse width modulator from said AND gate via said third external connection pin of said integrated circuit, and having a principal conduction path arranged for selectively applying said direct input potential across said primary winding in response to said selectively transmitted output pulse signal;

a first rectifier for supplying direct current output power responsive to alternating current power from said secondary winding, which direct current output power is supplied at a direct output potential;

a regulator for generating an error signal indicative of a departure of said direct output potential from a prescribed value; and circuitry for generating said direct potential applied to said second external connection pin of said integrated circuit to be used by said controller both as a direct operating potential and as an input control potential, the voltage of said direct potential being established when input power is initially supplied from said primary power supply during a start-up time before said switching transistor begins applying said direct input potential across said primary winding in response to said selectively transmitted output pulse signal, and the voltage of said direct potential being adjusted in response to said error after said start-up time.

3. The switching mode power supply according to claim 2 in combination with said primary power supply for supplying a direct input potential, wherein said primary power supply is of a type for receiving alternating-current power having an alternating potential and includes a second rectifier for supplying said direct input potential to said switching mode power supply as a rectified response to said alternating potential of said alternating-current power received by said primary power supply.

4. The controller according to claim 1 included in a switching mode power supply for receiving input power supplied at a direct input potential from an output of a primary power supply, which said switching mode power supply further comprises:

a first capacitor and at least a first resistor in a series connection across the output of said primary power supply for receiving said direct input potential, said first capacitor having first and second plates respectively connected to the first external connection pin of said integrated circuit and to the second external connection pin of said integrated circuit, said first capacitor being charged via said series connection during said start-up time;

a transformer having a primary winding and a secondary winding;

a switching transistor, having a control electrode connected for receiving the selectively transmitted output pulse signal of said pulse width modulator from said AND gate, and having a principal conduction path arranged for selectively applying said direct input potential across said primary winding in response to said selectively transmitted output pulse signal;

a first rectifier for supplying direct current output power responsive to alternating current power from said secondary winding, which direct current output power is supplied at a direct output potential;

a regulator for generating an error signal indicative of a departure of said direct output potential from a prescribed value; and a photo-coupler having an input circuit connected for receiving said error signal and having an output circuit connected in a shunt path across said first resistor.

5. The switching mode power supply according to claim 4 in combination with said primary power supply for supplying a direct input potential, wherein said primary power supply is of a type for receiving alternating-current power having an alternating potential and includes a second rectifier for supplying said direct input potential to said switching mode power supply as a rectified response to said alternating potential of said alternating-current power received by said primary power supply.

6. The switching mode power supply according to claim 4; wherein said transformer has in addition to said primary and secondary windings a tertiary winding with first and second ends, the first end of said tertiary winding being connected to receive said ground reference potential; wherein said series connection of said first capacitor and at least said first resistor further includes a second resisistor; wherein said first and said second resistors have respective first ends and have respective second ends, with the first end of said first resistor connected to the second plate of said capacitor, and with the second end of said first resistor and the first end of said second resistor having an interconnection therebetween; wherein a second rectifier connects from the second end of said tertiary winding to said interconnection between the second end of said first resistor and the first end of said second resistor; and wherein a second capacitor has a first plate connected to receive said ground reference potential and has a second plate connected to said interconnection between the second end of said first resistor and the first end of said second resistor.

7. The controller according to claim 1 included in a switching mode power supply for receiving input power supplied at a direct input potential from a primary power supply, which said switching mode power supply further comprises:

a primary power supply for supplying a direct potential from an output thereof;

a first capacitor and at least a first resistor in a series connection across the output of said primary power supply for receiving said direct potential, said connections for receiving direct operating potential for the controller being across said first capacitor, said first capacitor being charged via said series connection during said start-up time;

a transformer having a primary winding and a secondary winding;

a field effect transistor, having a gate electrode connected for receiving the selectively transmitted output pulse signal of said pulse width modulator from said AND gate, and having source and drain electrodes connected for selectively applying said direct input potential across said primary winding in response to said selectively transmitted output pulse signal;

a rectifier for supplying DC output power responsive to AC power from said secondary winding, which DC power is supplied at a direct output potential;

a regulator for generating an error signal indicative of a departure of said direct output potential from a prescribed value; and a photo-coupler having an input circuit connected for receiving said error signal and having an output circuit connected in a shunt path across said first resistor.

8. The switching mode power supply according to claim 7; wherein said transformer has in addition to said primary and secondary windings a tertiary winding with first and second ends, the first end of said tertiary winding being connected to receive said ground reference potential; wherein said series connection of said first capacitor and at least said first resistor further includes a second resisistor; wherein said first and said second resistors have respective first ends and have respective second ends, with the first end of said first resistor connected to the second plate of said capacitor, and with the second end of said first resistor and the first end of said second resistor having an interconnection therebetween; wherein a second rectifier connects from the second end of said tertiary winding to said interconnection between the second end of said first resistor and the first end of said second resistor; and wherein a second capacitor has a first plate connected to receive said ground reference potential and has a second plate connected to said interconnection between the second end of said first resistor and the first end of said second resistor.

9. The switching mode power supply according to claim 7 in combination with said primary power supply for supplying a direct input potential, wherein said primary power supply is of a type for receiving alternating-current power having an alternating potential and includes a second rectifier for supplying said direct input potential to said switching mode power supply as a rectified response to said alternating potential of said alternating-current power received by said primary power supply.

10. The controller according to claim 1 included in a switching mode power supply for receiving input power supplied at a direct input potential from a primary power supply, which said switching mode power supply further comprises:

a transformer having a primary winding and a secondary winding;

a field effect transistor, having a gate electrode connected for receiving the selectively transmitted output pulse signal of said pulse width modulator from said AND gate, and having source and drain electrodes connected for selectively applying said direct input potential across said primary winding in response to said selectively transmitted output pulse signal;

a rectifier for supplying direct current output power responsive to alternating current power from said secondary winding, which direct current output power is supplied at a direct output potential;

a regulator for generating an error signal indicative of a departure of said direct output potential from a prescribed value; and circuitry for generating said direct potential applied to said second external connection pin of said integrated circuit to be used by said controller both as a direct operating potential and as an input control potential, the voltage of said direct potential being established when input power is initially supplied from said primary power supply during a start-up time before said switching transistor begins applying said direct input potential across said primal winding in response to said selectively transmitted output pulse signal, and the voltage of said direct potential being adjusted in response to said error after said start-up time.

11. The switching mode power supply according to claim 10 in combination with said primary power supply for supplying a direct input potential, wherein said primary power supply is of a type for receiving alternating-current power having an alternating potential and includes a second rectifier for supplying said direct input potential to said switching mode power supply as a rectified response to said alternating potential of said alternating-current power received by said primary power supply.

12. A switching mode power supply for receiving input power having a direct input potential, said switching mode power supply comprising:

a transformer for transforming an alternating voltage generated from said direct input potential;

a rectifier for rectifying transformed alternating voltage from said transformer and producing a direct output potential;

a regulator, sinking a relatively larger current when the direct output potential from said rectifier is larger than a reference voltage, and sinking a relatively smaller current when the direct output potential from said rectifier is smaller than said reference voltage;

a photo-coupler conducting an input current thereinto in proportion to the magnitude of the current that said regulator sinks, converting the current into an optical signal, and then converting said optical signal into a photo-coupler output current;

a switching-mode-power-supply controller for performing the function of power supply, feedback and soft-start, to selectively supply pulse width modulated signal in response to an operating voltage signal supplied thereto through external pins thereof, the width of the pulses in said pulse width modulated signal being narrowed in response to decrease in said operating voltage signal and being widened in response to increase in said operating voltage signal, so long as said operating voltage signal is within a range of voltages of large enough values to provide sufficient power properly to operate elements within said switching-mode-power-supply controller;

a capacitor having first and second plates between which said operating voltage signal appears, connected to be charged by said photo-coupler output current;

a resistor connected for charging said capacitor toward said direct input potential during start-up for increasing said operating voltage signal to be within said range of voltages of large enough values to provide sufficient power properly to operate elements within said switching-mode power-supply controller; and switching means cyclically turned on and off in response to a pulse signal produced from said switching-mode-power-supply controller, connected for supplying an alternating voltage to said transformer by selectively applying said direct input potential to said transformer.

13. The switching mode power supply according to claim 12, wherein said switching means includes a field effect transistor.

14. The switching mode power supply according to claim 12, wherein said regulator comprises:

a differential-input amplifier having an output terminal, having a non-inverting input terminal to which said direct ouput potential is applied, and having an inverting input terminal to which a reference voltage; and a transistor having a base electrode to which the output terminal of said differential-input amplifier is connected, having an emitter electrode in common connection, and having a collector electrode through which said relatively larger current is sunk when the direct output potential from said rectifier is larger than said reference voltage, and through which said relatively smaller current is sunk when the direct output potential from said rectifier is smaller than said reference voltage.

15. A controller for a switching mode power supply, said controller constructed as an integrated circuit with only three external connection pins, a first of said three external connection pins for receiving a reference ground potential, a second of said three external connection pins for receiving a direct potential used by said controller both as a direct operating potential and as an input control potential, and a third of said three external connection pins for supplying a pulsed output control potential, said integrated circuit receiving no electric power except via said three external connection pins and demanding a current flow between said first and second external connection pins of a prescribed substantially constant value at least when said direct potential is above a lower threshold voltage, said controller further comprising within said integrated circuit:

an oscillator powered by application of said direct operating potential for generating oscillations;

a voltage comparator for comparing a fraction of said direct operating potential, as received by the controller via said second external connection pin, to a direct reference potential for developing a voltage comparator output signal;

a pulse width modulator for supplying an output pulse signal including pulses of a rate determined by said oscillations of a prescribed frequency generated by said oscillator and with a width controlled by said comparator output signal, the duty ratio of an output pulse being larger or smaller in amplitude depending on whether said fraction of said direct operating potential received by the controller via said second external connection pin is larger or smaller than said direct reference potential; and an under-voltage lock-out circuit for forestalling application of output pulse signal from said pulse width modulator to said third external connection pin when the direct operating potential for the controller received via said second external connection pin has not risen above a higher threshold voltage since falling below said lower threshold voltage, and for causing application of output pulse signal from said pulse width modulator to said third external connection pin when the direct operating potential for the controller has risen above said higher threshold voltage since falling below said lower threshold voltage.

16. A switching mode power supply for receiving input power supplied at a direct input potential from an output of a primary power supply, which said switching mode power supply comprises:

a transformer having a primary winding and a secondary winding;

a switching transistor, having a control electrode connected for receiving a selectively supplied input pulse signal, and having a principal conduction path arranged for selectively applying said direct input potential across said primary winding in response to said input pulse signal received at its said contol electrode;

a first rectifier for supplying direct current output power responsive to alternating current power from said secondary winding, which direct current output power is supplied at a direct output potential;

a regulator for generating an error signal indicative of a departure of said direct output potential from a prescribed value; and circuitry for generating said selectively supplied input pulse signal in response to said error signal, which said circuitry comprises:

an oscillator for generating oscillations;

a voltage comparator for comparing a fraction of a direct feedback signal potential to a direct reference potential for developing a voltage comparator output signal;

a pulse width modulator for supplying an output pulse signal including pulses of a rate determined by said oscillations generated by said oscillator and with a width controlled by said comparator output signal, the duty ratio of an output pulse being larger or smaller in amplitude depending on whether said fraction of said direct feedback signal potential is larger or smaller than said direct reference potential;

an AND gate responsive to a controlling signal for selectively supplying the output pulse signal of said pulse width modulator to the control electrode of said switching transistor as said input pulse signal selectively supplied thereto;

an under-voltage lock-out circuit for generating said controlling signal, for interrupting supply of the output pulse signal of said pulse width modulator to the control electrode of said switching transistor when said direct feedback signal potential has not risen above a higher threshold voltage since falling below a lower threshold voltage, and for enabling supply of the output pulse signal of said pulse width modulator to the control electrode of said switching transistor when said direct feedback signal potential has risen above said higher threshold voltage since falling below said lower threshold voltage;

a first capacitor having a first plate and a second plate between which said direct feedback signal potential is developed;

at least a first resistor in a series connection with said first capacitor across the output of said primary power supply for receiving said direct input potential, for charging said first capacitor to develop a direct feedback signal potential greater than zero when input power is initially from the output of said primary power supply; and a photo-coupler having an input circuit connected for receiving said error signal and having an output circuit connected in a shunt path across said resistor, for regulating the charging and discharging of said first capacitor and thereby adjusting said direct feedback signal potential.

17. The switching mode power supply set forth in claim 16, wherein said oscillator is powered by said direct feedback signal potential being supplied thereto as a direct operating potential.

18. The switching mode power supply according to claim 16; wherein said transformer has in addition to said primary and secondary windings a tertiary winding with first and second ends, the first end of said tertiary winding being connected to the first plate of said first capacitor; wherein said series connection of said first capacitor and at least said first resistor further includes a second resisistor; wherein said first and said second resistors have respective first ends and have respective second ends, with the first end of said first resistor connected to the second plate of said capacitor, and with the second end of said first resistor and the first end of said second resistor having an interconnection therebetween; wherein a second rectifier connects from the second end of said tertiary winding to said interconnection between the second end of said first resistor and the first end of said second resistor; and wherein a second capacitor has a first plate connected to the first plate of said first capacitor and has a second plate connected to said interconnection between the second end of said first resistor and the first end of said second resistor.

* * * * *